United States Patent [19]

Weller

[11] Patent Number: 5,207,133
[45] Date of Patent: May 4, 1993

[54] APPARATUS FOR FEEDING DAMPING FLUID INTO GUIDE TUBES IN MULTIPLE-SPINDLE TURNING MACHINES AND THE LIKE

[75] Inventor: Hans-Michael Weller, Marbach, Fed. Rep. of Germany

[73] Assignee: Hainbuch Praezisions-Spannwerkzeugfabrik GmbH, Marbach, Fed. Rep. of Germany

[21] Appl. No.: 834,265
[22] PCT Filed: Aug. 8, 1990
[86] PCT No.: PCT/EP90/01300
 § 371 Date: Feb. 19, 1992
 § 102(e) Date: Feb. 19, 1992
[87] PCT Pub. No.: WO91/02612
 PCT Pub. Date: Mar. 7, 1991

[30] Foreign Application Priority Data

Aug. 21, 1989 [DE] Fed. Rep. of Germany ....... 3927532

[51] Int. Cl.$^5$ ........................ B23B 13/04; B23B 13/08
[52] U.S. Cl. ........................................ 82/126; 82/163
[58] Field of Search ................... 82/126, 129, 163; 414/14, 17

[56] References Cited

U.S. PATENT DOCUMENTS

| 3,890,860 | 6/1975 | Gordon | 82/38 |
| 3,941,256 | 3/1976 | Doe et al. | 214/1.4 |
| 4,577,536 | 3/1986 | Lechot et al. | 82/2.7 |
| 4,624,612 | 11/1986 | Geiser et al. | 414/18 |
| 4,649,779 | 3/1987 | Juillerat | 82/2.7 |
| 4,679,470 | 7/1987 | Geiser et al. | 82/2.7 |

FOREIGN PATENT DOCUMENTS

| 108182 | 5/1984 | European Pat. Off. . |
| 121638 | 10/1984 | European Pat. Off. . |
| 142232 | 5/1985 | European Pat. Off. . |
| 180686 | 5/1986 | European Pat. Off. . |
| 371373 | 6/1990 | European Pat. Off. . |
| 3409345 | 9/1984 | Fed. Rep. of Germany . |
| 641073 | 2/1984 | Switzerland . |

*Primary Examiner*—William E. Terrell
*Attorney, Agent, or Firm*—Foley & Lardner

[57] ABSTRACT

The feeding apparatus has a holding plate (15) which is provided with passage bores (18) for the accommodation and mounting of the rear end of the guide tubes (12) of the turning machine. The holding plate (15) is mounted on a supporting frame (16) for rotation about the central axis of the spindle drum of the turning machine. On the side of the holding plate (15) facing away from the spindle drum there is a cover plate (26) which is coupled non-rotatably to the supporting frame (16) and which is sealed against the holding plate (15). Between the holding plate (15) and the cover plate (26) is a distribution passage (38) with which on the one hand the openings of the guide tubes (12) are in communication and to which on the other hand a damping fluid feed line is connected. Advantageously, a passage bore (42) is present in the cover plate (26) in the alignment of one of the guide tubes (12), and can be closed by a closure (43) whose passage width is at least approximately equal to the largest diameter of the workpieces.

15 Claims, 6 Drawing Sheets

APPARATUS FOR FEEDING DAMPING FLUID INTO GUIDE TUBES IN MULTIPLE-SPINDLE TURNING MACHINES AND THE LIKE

Multiple-spindle turning machines have a number of rod guides for the rod-like workpieces which are fed to the working spindles section-wise from the rear end of the turning machine. This feed is usually performed mechanically by means of collets. The rod guides are generally in the form of tubes into which the rods are loaded from the rear end into the collets, which are situated within the working spindles and rotate with them. The tubes do not rotate. The rod-like workpieces, however, rotate with the working spindles. Consequently, the section of the length of the workpieces situated in the guide tubes rotate with respect to the tubes. To prevent the wear on the workpieces and on the tubes themselves from being too great in this relative movement, and also to keep the noise as low as possible, a damping fluid with lubricating properties is made to flow through the guide tubes. This damping fluid must be fed individually to the rear end of the guide tubes.

In a known feeding apparatus (DE-U 88 14 860.2) the rear end of the guide tubes is fastened to a common holding plate. This holding plate has an axial bore to receive and hold each guide tube. The holding plate is journaled for rotation about the central axis of the spindle drum with which it rotates circumferentially to a certain degree each time the workpieces change station. The bearing of the holding plate is in a supporting frame.

The bearing of the holding plate is formed by a cylindrical circumferential surface on the supporting frame and one on the holding plate which are fitted to one another. In the area of these common bearing surfaces a circumferential distributing groove is present, which is connected to a line feeding the damping fluid. Seals are present on both sides of the distributing groove which seal the annular interstice between the two circumferential surfaces from the exterior. Within the holding plate connecting passages are present which connect the distributing groove to the interior of each of the guide tubes. Each of the guide tubes is closed at its end with a cap closure which is removably attached to the holding plate where it surrounds the guide tube.

Aside from the fact that, in this apparatus, the bearing and sealing surfaces provided for the holding plate have a comparatively large diameter and therefore the seals used in them are very expensive, this apparatus also has the disadvantage that the guide tube cap closures on the holding plate have to be removed individually in a change of workpieces to enable another workpiece to be introduced.

Another great disadvantage of this apparatus is that the cap closures protrude outwardly in the axial direction beyond the end face of the holding plate. Since the holding plate rotates sectionally with the spindle drum, the cap closures also rotate whenever the spindle drum turns. This represents a not inconsiderable hazard for the operating personnel if they accidentally stand near the holding plate, plus the fact that it is precisely in the area of the rear end of the guide tubes that there is little room available and the operating personnel has little freedom of movement.

The invention specified in claim is addressed to the problem of creating an apparatus for feeding the damping fluid into guide tubes in multiple-spindle turning machines and the like, in which the danger of accidents due to exposed rotating parts will be reduced or even eliminated and the loading of the guide tubes will be facilitated, and that furthermore the structural requisites for an automated loading of the tubes will be created.

In the feeding apparatus according to claim 1, the cover plate completely covers the back end of the holding plate. Since the cover plate is still, even when the spindle drum and the holding plate are rotating, there are no exposed parts which perform a rotatory movement. Thus any danger of injury to the operating personnel by rotating parts is eliminated.

To reload workpieces, either the cover plate is removed as a whole, or a lid-like part of it is removed, while the part with the gasket against the holding plate remains in place. When the cover plate is removed or when the lid is removed, the guide tubes are freely accessible for reloading.

In an embodiment of the feeding apparatus according to claim 2, it is no longer necessary for the entire cover plate or lid to be removed, but only the parts of the cover whose dimensions are only slightly larger than the passage bores in the guide tubes.

Even if the cover parts or the fasteners serving to attach them to the cover plate should protrude past the back end of the cover plate, there is still no danger of injury, since these cover parts are also still, together with the cover plate.

In an embodiment of the feeding apparatus according to claim 3, the opening and closing of the cover parts can be performed mechanically. The opening and closing movements can even be automated. This creates the possibility of using an automatic loader for the rod-like workpieces.

In an embodiment of the feeding apparatus according to claim 4, no special space is needed for operating the cock plug as the closure, because the cock plug is merely rotated on its axis. In a further development of this feeding apparatus according to claim 5, individual sealing rings can be used in order to seal the spherical cock plug against the cock housing. These sealing rings can be replaced in case of necessity.

With an embodiment of the feeding apparatus according to claim 6, loading with fresh workpieces can again be automated, and an automatic loading apparatus can be used for the purpose.

In an embodiment of the feeding apparatus according to claim 7, it is brought about that the guide tube situated in the loading station [at] the rotational position of the spindle drum is shut off from the distribution passage. When this one guide tube is being loaded, therefore, the distribution passage and the other guide tubes connected to it can remain full of the damping fluid. The normal pumping pressure can even be sustained in the damping fluid without allowing the damping fluid to escape when the guide tube is open for loading. In a further development of this feeding apparatus according to claim 8, the guide tube that is in the loading station can also be immediately refilled with damping fluid, even though it is separated by the shut-off device from the normal distribution passage.

In a feeding apparatus configured according to claim 9, the guide tube that is in the loading station can be loaded without the need first to empty this guide tube. First the new workpiece is introduced into the sealing device before the closure, especially the cock, is opened. After the cock is opened the workpiece can be inserted through the plug of the cock, while the sealing device prevents the outward escape of the damping fluid. As soon as the end of the workpiece has passed the cock, the cock is reclosed. If such a sealing device is also placed on the other side of the cock, the cock can be closed when the end of the workpiece is still in the area of the second sealing device. In this manner the amount of damping fluids that escape—which is slight anyway—is still further reduced. In a further development of the feeding apparatus according to claim 10, the sealing effect of the one or both of the sealing devices is still further improved.

The invention will be further explained below with reference to a number of embodiments represented in the drawing, wherein.

Figure 1:
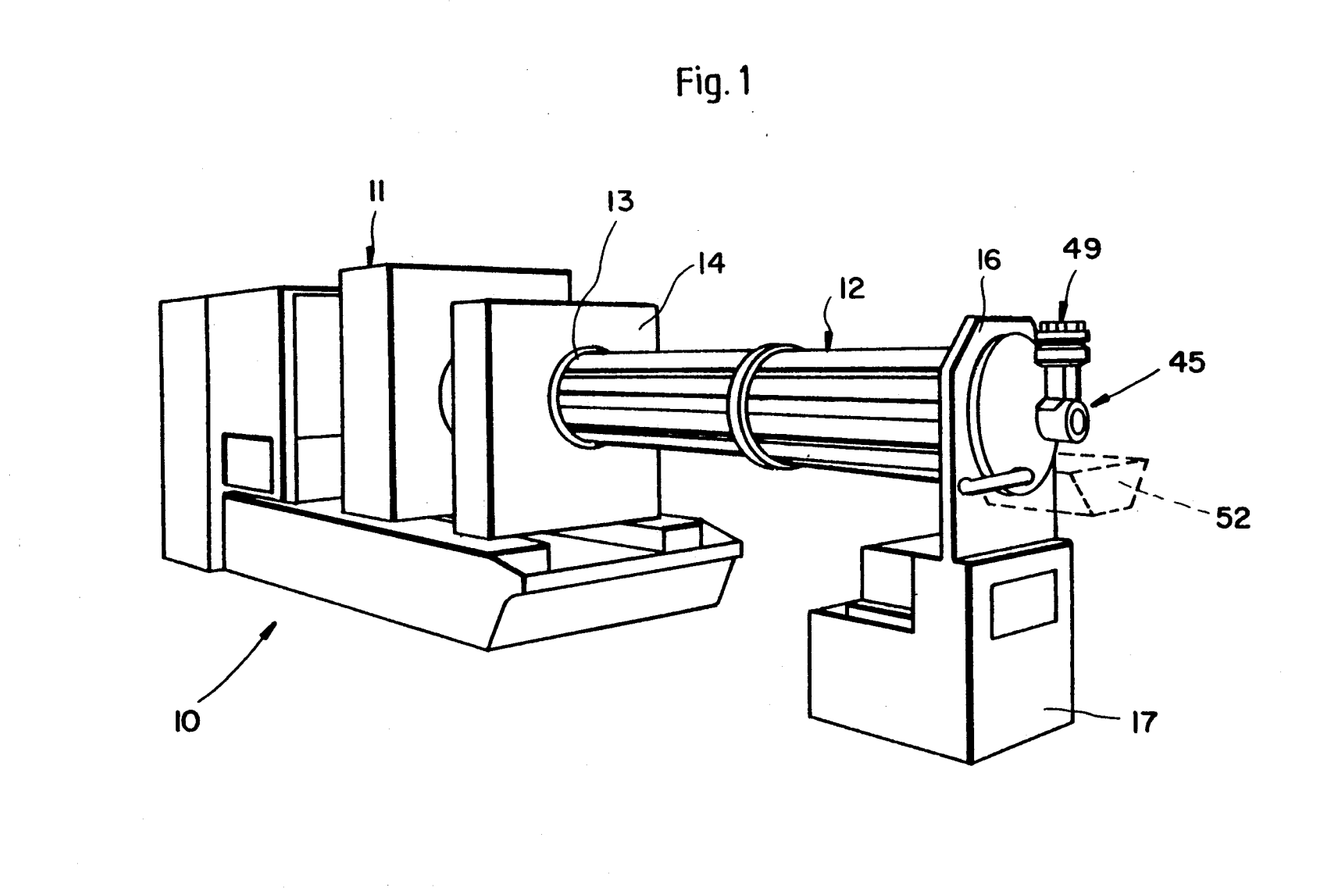
FIG. 1 is a perspective view of a multiple-spindle turning machine for rod machining, with a number of guide tubes for the workpieces, and with an apparatus for feeding the damping fluid to the back end of the guide tubes.

In the multiple-spindle turning machine 10 seen in FIG. 1, a number of guide tubes 12 extend rearwardly from the spindle drum and the rod-like workpieces which are machined by the turning machine are contained in them. The guide tubes 12 are held at their front end facing the spindle drum 11 by a holding plate 13 which is journaled in a front supporting frame 14. At its back end the guide tubes 12 are held by a rear holding plate 15 which is journaled in a rear supporting frame 16. The supporting frame 16 rests on a base 17 in which, among other things, a pump is housed for feeding a damping fluid for the workpieces into the guide tubes 12.

Figure 3:
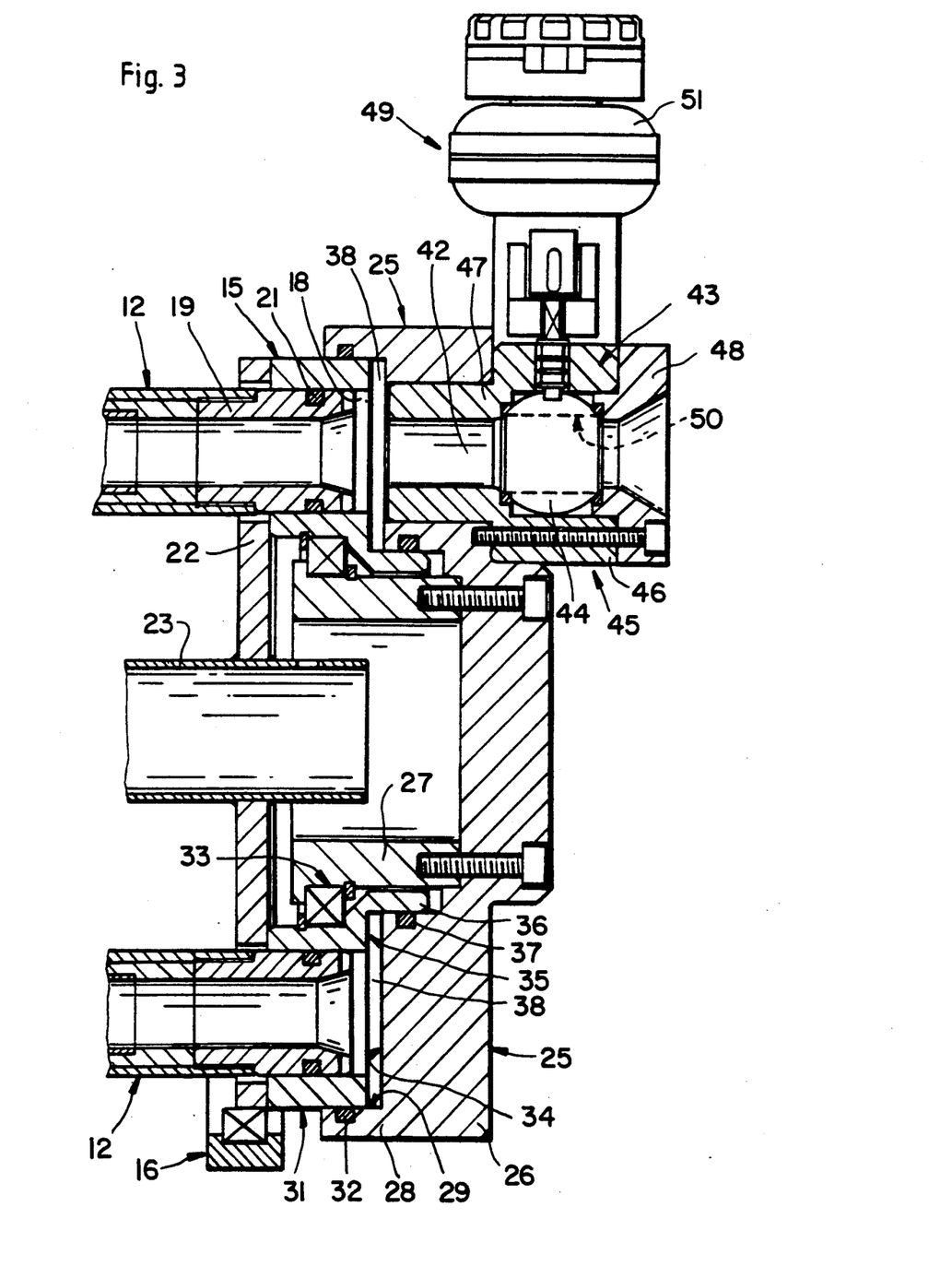
FIG. 3 is a fragmentary horizontal cross section of the feeding apparatus of FIGS. 1 and 2.

The holding plate 15 has one passage bore 18 for each guide tube 12, and into it there is inserted an end piece 19 threaded into the guide tube 12. This end piece 19, and with it the guide tube 12, is sealed against the holding plate 15 by means of a sealing ring 21 which is placed in a circumferential groove in the end piece 19.

On the side of the holding plate 15 facing the turning machine there is a driving disk 22 which is welded at its center to a driving tube 23. The driving tube 23 reaches all the way to the front holding plate, to which it is affixed. This provides so that, in a step-wise rotatory movement of the spindle drum and the front holding plate, the rear holding plate 15 will be moved in the same degree without twisting the comparatively long guide tubes 12. The driving disk 22 is screwed to the holding plate 15.

The back face of the holding plate 15 is protected and closed off by a cover plate 25. The cover plate 25 is of bipartite construction to facilitate its manufacture and its installation. The outer part 26 and the inner part 27 of the plate are screwed together.

The cover plate 25 has on its outer part 26 an annular collar 28 whose inside circumferential surface 29 is fitted to the outer circumferential surface 31 of the holding plate 15. In the area of the cylindrical collar 28 there is a circumferential groove into which a sealing ring 32 is placed which provides for a sufficient seal between the holding plate 15 and the cover plate 25.

The holding plate 15 turns step-wise with the spindle drum of the turning machine. The cover plate 25 is coupled to supporting frame at least so as to prevent its rotation, so that it remains still.

In order to relieve the stress in the radial direction on the sealing ring 32 acting between these two plates, and since it does not have to provide any guiding function, but needs only to seal, a rolling bearing 33 is provided between the holding plate 15 and the inner part 27. With abutments and retaining rings it is capable of absorbing not only the radial guidance forces but also axial guidance forces, so that the same axial relationship is preserved between the cover plate 25 and the holding plate 15.

As it can be seen in FIG. 3, the cover plate 25 has a circular inside face section 34, which is axially spaced away by a certain amount from the end face section 35 of the holding plate 15 that is opposite it in the same radial area. At the inside margin of the inside face section 34 the holding plate 15 has a circular collar 36 which is fitted to a step in the cover plate 25. In this step in the cover plate 25 a sealing ring 37 is laid in a circumferential groove of the cover plate 25. In this manner an annular space is created which is defined in the axial direction by the inside face section 34 of the cover plate 25 and by the end face section 35 of the holding plate 15, and is defined in the radial direction by the collar 28 of the cover plate 25 and by the collar 36 of the holding plate 15. This annular space forms a distribution passage 38 for all of the guide tubes 12 whose interior opens into this distribution passage 38.

Figure 2:
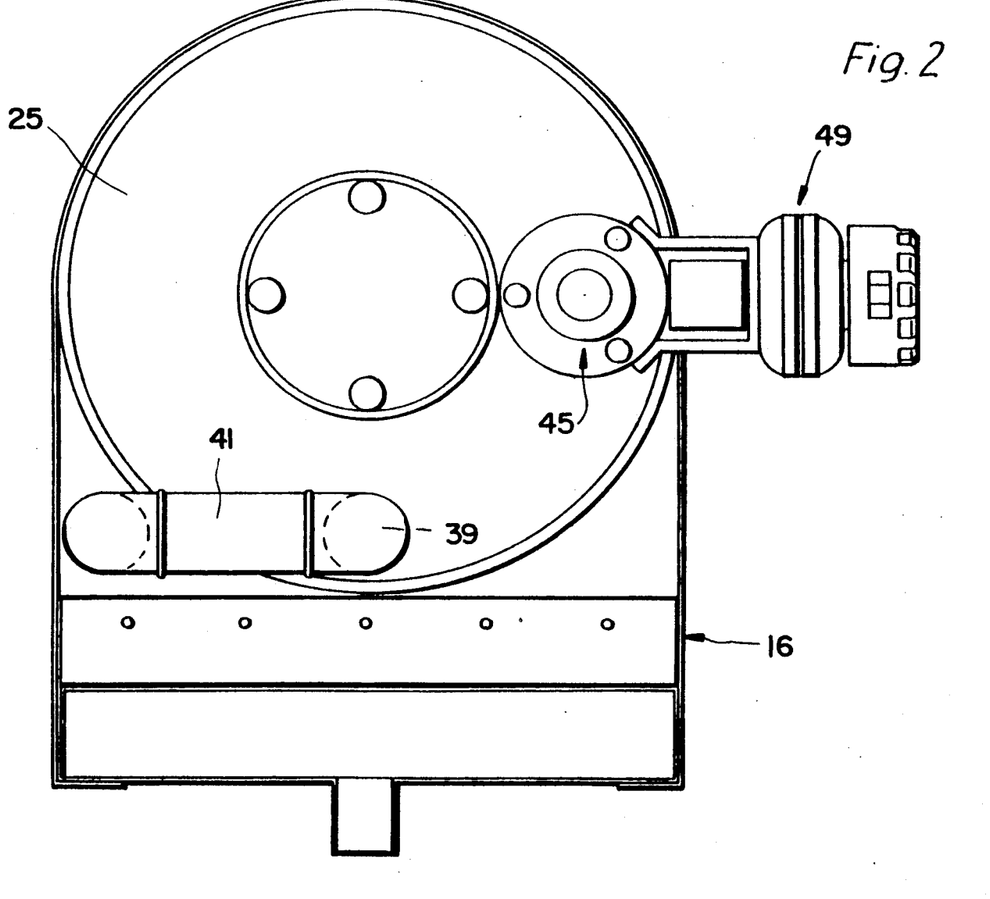
FIG. 2 is a rear view of the feeding apparatus according to FIG. 1.

In the radial area cf the distribution passage 38 a passage bore 39 is present in the cover plate 25 (FIG. 2) to which a supply line 41 is connected on the outside of the cover plate 25 for the damping fluid which is delivered by a pump housed in the base 17.

To load the guide tubes 12, a bore 42 is provided in the cover plate 25 (FIG. 3) which is aligned on the circle of the axes of the guide tubes 12 and therefore is in line with one of the guide tubes 12. This bore 42 serves as the loading opening. Therefore it has an inside diameter that is at least equal to the greatest inside diameter of the guide tubes 12 and their end pieces 19 Since the feeding device of the turning machine (seen from the rear) is usually in the 3-o'clock position of the working stations, the loading opening 41 is also situated in this circumferential position on the cover plate 25.

Since the bore 42 serving as the loading opening also opens into the distribution passage 38, a closure 43 is present, by which the bore 42 can be closed from the outside. This closure 43 is formed by the spherical cock plug 44 of a ball cock 45. In FIG. 3 the cock plug 44 is represented in its open position to which it is set when the guide tube 12 behind it is being loaded.

The cock case 46 has a cylindrical guiding projection 47 which is inserted into the bore 42 of enlarged outside diameter in the cover plate 25. A sealing ring not shown provides for a sufficient seal between the cock case 46 and the cover plate 25.

On the outside of the cock case 46 there is fastened an insertion funnel 48 which facilitates the introduction of the rod-like workpieces into the bore of the cock plug 44.

The ball cock 45 has, in a conventional manner, an actuating means 49 with a power drive 51 which here is an air drive.

As it can be seen in FIG. 1, a catch pan 52 is disposed under the cover plate, especially below the ball cock 45, in which the damping fluid is caught if it escapes from the opened ball cock 45 when a guide tube is loaded.

Figure 4:
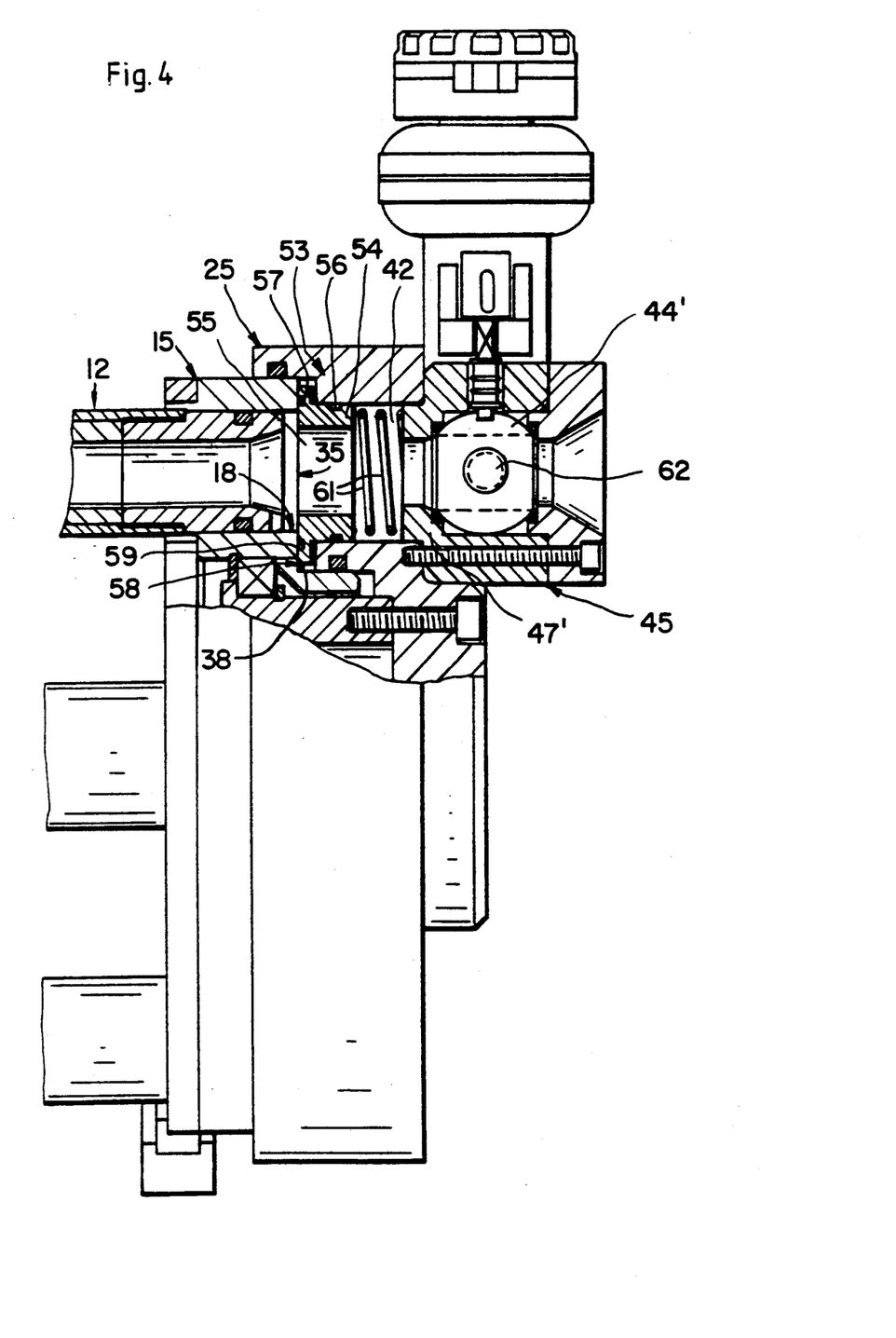
FIG. 4 is a cutaway top view of a modified embodiment of the feeding apparatus.
Figure 5:
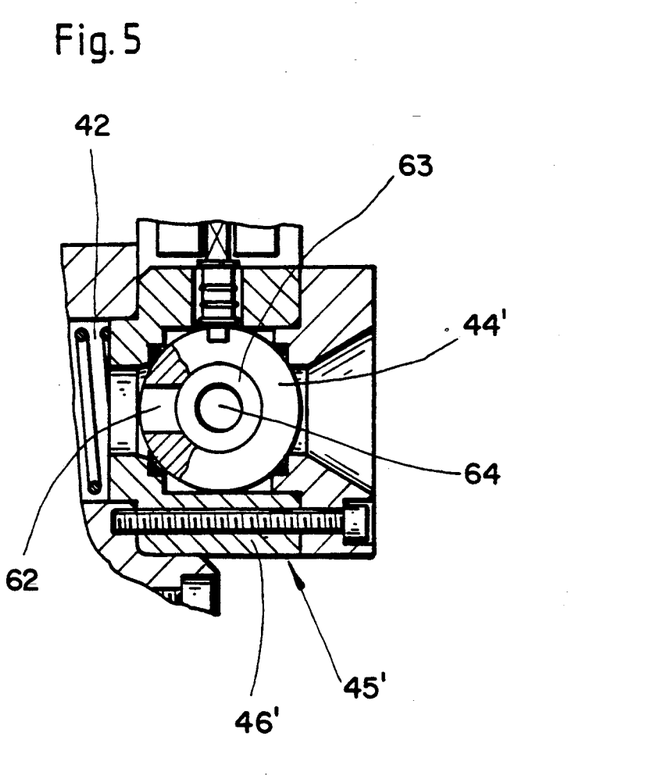
FIG. 5 is a fragmentary horizontal cross section of FIG. 4 with one of the parts is another working position.

In FIG. 4 and FIG. 5 can be seen an embodiment of the feed apparatus which is modified in the area of the loading opening 42, in which it is no longer necessary to empty all of the guide tubes 12 during a workpiece change, but only the guide tube that is in the loading station, and then only when it is to be loaded. The reference numbers of any parts that differ from the embodiment described previously are provided with a prime mark.

On the ball cock 45' the guiding projection 47' is very greatly shortened. Into the bore 42 of the cover plate 25, which is thus made available in its full inside width, a shut-off device 53 is inserted. This device has an annular shut-off means 54. This shut-off means has an axial passage bore 55 whose inside width is at least equal to the inside width of the other bores. In the outer circumference of the shut-off means 54, which is fitted to the interior circumference of the bore 42, a circumferential groove is present into which a sealing ring 56 is inserted. At the end facing the holding plate 15 the shut-off means 54 has a circular flange 57 in whose annular face 58 is a circumferential groove into which a sealing ring 59 is inserted. The end face 58 is in contact with the end face section 35 of the holding plate 15, which defines the distribution passage 38 on the side facing the turning machine. The end face 58 of the shut-off means 54 has a larger diameter than the bore 18 in the holding plate 15 into which the guide tube 12 is inserted. The sealing ring 59 in the end face 58 also has a larger diameter. Thus, the passage bore 18 of the holding plate 15, situated in line with the shut-off device 53, is shut off from the distribution passage 38.

To enable the shut-off device 53 to be always active, a helical compression spring 61 is inserted between the shut-off device 54 and the guiding projection 47' of the ball cock 45 and urges the shut-off device 54 against the end face section 35.

Since in the turning machine a machining of the workpieces also takes place in the feed station in addition to an advancing movement, damping fluid must be fed also to this guide tube 12. Since this is not possible from the distribution passage 38, the spherical plug 44' of the ball cock 45 is provided in one of its spherical sealing surfaces with an additional bore 62 which leads into the main passage 63 through the cock plug 44'.

On the cock case 46' a bore 64 is present on the one side, whose axis is in line with the center of the ball of the cock plug 44' and is at right angles to the alignment of the loading opening 42. To this bore 64 a connecting line is connected on the outside of the cock case 46', and then is connected to the main feed line 41. In this manner the damping fluid can pass from the feed line 41 through the passage bore 64 in the cock case 46' into the interior of the cock plug 44' and from there through the bore 62 into the guide tube 12, although this guide tube 12 is shut off from the distribution passage 38 in the holding plate 15.

Figure 6:
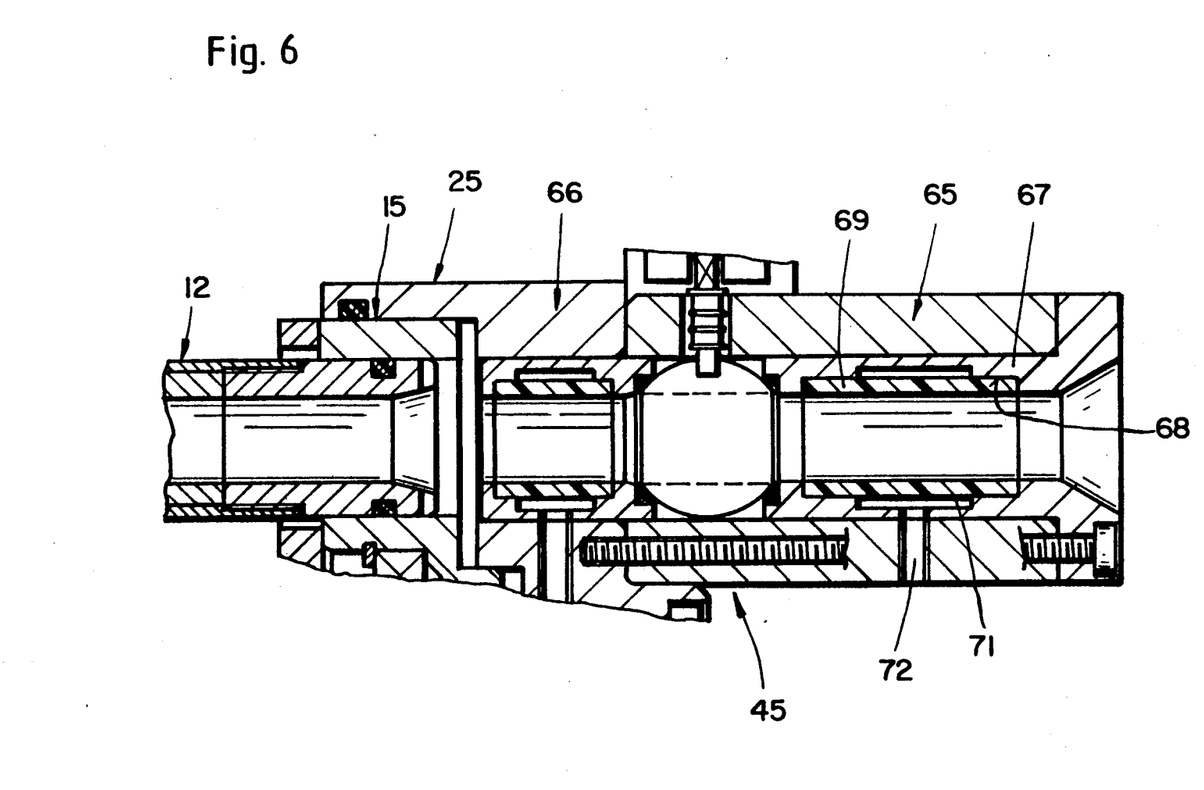
FIG. 6 is a fragmentary horizontal cross section of a portion of another embodiment of the feeding apparatus.

By means of the shut-off device 53 explained above, the guide tube 12 that is in the position in question is shut off from the distribution tube 38. During the loading procedure this guide tube 12, however, is completely open to the exterior when the ball cock 45 is open. In order even in this case to prevent escape of the damping fluid, the sealing devices 65 and 66 can be used. These are inserted ahead of and behind the ball cock 45. The shut-off device 53 can in this case be dispensed with.

In the case of the sealing device 65, a cylindrical recess 68 is present inside of a sleeve-like casing 67. Into it there is inserted a hose-like constriction collet 69 which is sealingly cemented at both its end sections to the casing 67. The constriction collet 69 is made from an elastomeric material with very great resistance to wear.

In the middle longitudinal portion of the constriction collet 69 a cylindrical recess 71 is present in the casing 67. Into it leads a radially aligned feed line 72 to which a connecting line is connected outside of the casing 67 for a fluid which can be subjected to a certain working pressure by means of a pressure generator not shown.

The sealing device 66 is basically made the same as the sealing device 65, but it is generally made shorter axially on account of the limited space generally available.

The loading of the guide tube 12 in the loading station is performed as follows: with the ball cock 45 closed a rod-like tool is inserted all the way into the sealing device 65. If the constriction collet 69 is not brought by its elastic properties into sealing contact all around the workpiece, pressure is applied to the fluid in the recess 71 through the feed line 72 so that the middle section of the length of the constriction collet 69 comes into sealing contact with the workpiece. Then the ball cock 45 is opened and the workpiece is pushed through it and through the second sealing device 66 all the way into the guide tube 12. Then, as soon as the rear end of the workpiece has arrived in range of the first sealing device 65, the second sealing device 66 is pressurized, so that its sealing tube likewise sealingly engages the workpiece. When the back end of the workpiece has emerged from the ball cock 45, but is still in the second sealing device 66, the ball cock 45 is closed. As the workpiece continues to be advanced by means of the feeding device of the turning machine, no more damping fluid can then leak out.

If for reasons of space the second sealing device 66 cannot be provided, the escape of the damping fluid can also be largely prevented by using for the insertion of the workpiece an inserting tool having the same cross-sectional shape as the workpiece. With this inserting tool the workpiece is inserted past the ball cock 45. Then the inserting tool is withdrawn so far that the ball cock can be closed. Only then is the inserting tool withdrawn from the sealing device 65.

If the sealing device 65 is to be made without the cylindrical recess 71 and without the feed line 72 for the fluid, it is desirable to make the constriction collet 69, at least over a certain portion of its length, with a slight undersize with respect to the outline projection of the workpieces. In the embodiment of the sealing device 65 previously described, in which the constriction collet 69 can be operated with a fluid, this constriction collet can be slightly oversize with respect to the outline projection of the workpieces, since this oversize will be compensated by feeding in the fluid with resulting elastic deformation of the constriction collet 69.

I claim:
1. A feed device for a turning machine, comprising:
a spindle drum having a central axis;

a plurality of guide tubes each having an opening therein and a first end which faces away from said spindle drum;

a holding plate having a plurality of axial passage bores therein, a front side facing toward said spindle drum, and a rear side facing away from said spindle drum, said first end of each of said plurality of guide tubes being fastened to and mounted in a corresponding one of said axial passage bores;

a supporting frame;

a bearing, disposed in said supporting frame, which supports said holding plate thereby allowing said holding plate to rotate about said central axis of said spindle drum;

a connecting line in communication with said plurality of guide tubes;

a common supply line connected to said connecting line for supplying damping fluid to said plurality of guide tubes;

a cover plate, disposed proximate said firs ends on said rear side of said holding plate, which covers said holding plate at least up to a diameter within which said plurality of guide tubes are disposed, said cover plate being coupled to said supporting frame so that it cannot rotate;

a seal disposed between said holding plate and said cover plate so that said rear side of said holding plate is sealed from the external environment;

wherein said connecting line is disposed between said holding plate and said cover plate and serves as a distribution passage for supplying damping fluid to said openings of said plurality of guide tubes, and said cover plate has a first passage bore therein which connects said common supply line to said distribution passage.

2. A feeding device as recited in claim 1, wherein said cover plate has at least one passage bore therein which is aligned with one of said guide tube openings, sand said cover plate passage bore has an inner width which is at least equal to a greatest outside dimension of a rod-like workpiece to be inserted in said cover plate passage bore, and further comprising a closure for closing said additional passage bore.

3. A feeding device as recited in claim 2, further comprising a guide which guides a movement of said closure relative to said cover plate between a first position whereby said cover passage bore is closed and a second position whereby said cover plate passage bore is open, and an actuating device which moves said closure between said first and second positions.

4. A feeding device as recited in claim 1, wherein said cover plate has at least one passage bore which is aligned with a center line of at least one of said plurality of guide tubes and which has an inside width that is at least equal to a greatest outside dimension of a workpiece to be inserted in said cover plate passage bore, and further comprising a rotatable cock including an axis of rotation and a plug with a passage bore therein, said plug passage bore extending transversely to said axis of rotation and having an inside width which is at least equal to a greatest outside dimension of a workpiece to be inserted in said plug passage bore.

5. A feeding device as recited in claim 4, wherein said cock is a ball cock.

6. A feeding device as recited in claim 4, further comprising an actuating device and a power drive which is coupled to said actuating device, said actuating device driving said cock.

7. A feeding device as recited in claim 2, further comprising a shut-off device disposed in said additional passage bore, said shut-off device 1) having a passage bore therein which is aligned with said cover plate passage bore and which has an inside width that is at least equal to said greatest outside dimension of said rod-like workpiece, 2) being sealingly connected to said cover plate and 3) being in sealing contact with said holding plate proximate to at least one of said plurality of axial passage bores so that said at least one of said plurality of axial passage bores does not communicate with said distribution passage;

wherein said cover plate passage bore is connected to said connecting line between said shut-off device and said closure.

8. A feeding device as recited in claim 4, further comprising a shut-off device disposed in said cover plate passage bore, said shut-off device 1) having a passage bore therein which is aligned with said cover plate passage bore and which has an inside width that is at least equal to said greatest outside dimension of said workpiece, 2) being sealingly connected to said cover plate and 3) being in sealing contact with said holding plate proximate to at least one of said plurality of axial passage bores so that said at least one of said plurality of axial passage bores does not communicate with said distribution passage;

wherein said cover plate passage bore is connected to said connecting line between said shut-off device and said rotatable cock.

9. A feeding device as recited in claim 7, wherein said closure is an actuable closure in the form of a cock having a first opening, and said cover plate passage bore is connected to said connecting line through said first opening.

10. A feeding device as recited in claim 9, wherein said closure includes a second opening which is connected to said connecting line.

11. A feeding device as recited in claim 8, wherein said rotatable cock is an actuable closure in the form of a cock having a first opening, and said cover plate passage bore is connected to said connecting line through said first opening.

12. A feeding device as recited in claim 11, wherein said rotatable cock includes a second opening which is connected to said connecting line.

13. A feeding device according to claim 4, further comprising a sealing device adjacent to said cover plate and aligned with a center of said cover plate passage bore, said sealing device having a passage bore therein, said sealing device passage bore having a cross-section which corresponds to an axial projection of said workpiece, and wherein said sealing device includes a sealing member which is elastic in at least a radial direction and which in a loose state is slightly undersized relative to said axial projection.

14. A feeding device according to claim 13, wherein said sealing member has an outer circumferential surface having an annular passage therein, and further comprising a controllable fluid feed devices for supplying fluid to said annular passage such that at times when fluid is supplied, an overpressure is applied to said outer circumferential surface.

15. A feeding device according to claim 5, further comprising an actuating device and a power drive which is coupled to said actuating device, said actuating device driving said cock.

* * * * *